United States Patent [19]

Chitil et al.

[11] 4,031,309
[45] June 21, 1977

[54] ARRANGEMENT FOR PRODUCING STEEL

[75] Inventors: Manfred Chitil, Essen-Frintrop; Gotthard Hubatsch, Mulheimer (Ruhr), both of Germany

[73] Assignee: Klöckner-Werke AG, Duisburg, Germany

[22] Filed: Oct. 22, 1975

[21] Appl. No.: 624,978

[30] Foreign Application Priority Data

Oct. 24, 1974 Germany .......................... 2450495

[52] U.S. Cl. .................................... 13/10; 13/33; 266/215; 266/240
[51] Int. Cl.$^2$ .......................................... F27D 3/10
[58] Field of Search ................. 13/10, 33; 266/215, 266/220, 240, 236

[56] References Cited

UNITED STATES PATENTS

| | | | |
|---|---|---|---|
| 3,350,083 | 10/1967 | Buhrer et al. .................. | 266/240 X |
| 3,706,449 | 12/1972 | Anderson et al. ............. | 266/240 X |
| 3,737,153 | 6/1973 | Steffora et al. ................ | 266/236 X |
| 3,789,126 | 1/1974 | Brusa ............................. | 13/33 |

*Primary Examiner*—R. N. Envall, Jr.
*Attorney, Agent, or Firm*—Michael J. Striker

[57] ABSTRACT

An electric furnace has an inlet opening for introduction of starting materials in the upper region thereof. A pre-melting vessel is arranged above the furnace and has a discharge opening above and in communication with the inlet opening of the furnace. The bottom portion of the furnace is formed with a depression in which the starting material forms a body after its introduction through the inlet opening and is heat-treated so as to obtain slag and steel. The furnace is provided at its sides with a pair of mounting members each having a cam surface of part-circular configuration having a center on an axis which extends substantially horizontally and is located at the inlet opening of the furnace. A plurality of rollers engages the cam surfaces, the rollers being mounted on a support for rotation about their axes. An interchangeable sleeve-shaped element bounds the inlet opening and may be funnel-shaped and/or diverge in the downward direction, the axis extending through the narrowest region of the sleeve-shaped element. Due to this mounting of the furnace, and due to the shape of the sleeve-shaped element, the starting materials are continuously introduced through the inlet opening regardless of the tilted position of the furnace. The furnace further includes outlet openings for slag and steel which may be tapped in the tilted positions of the furnace.

23 Claims, 2 Drawing Figures

ARRANGEMENT FOR PRODUCING STEEL

BACKGROUND OF THE INVENTION

The present invention relates to a steel-producing installation, and more particularly to an arrangement for producing steel from scrap, sponge iron, pellets or similar materials.

There are already known various installations for producing steel from various starting materials, among them scrap, pellets or sponge iron and similar materials. The present invention is concerned with an arrangement of the latter type. It is well known that these substances constitute very valuable starting materials for production of steel. However, it is also already known that such materials cannot be used as such by being only melted and then cast into forms to constitute ingots. Rather, particularly since these materials contain large amounts of impurities, such as oxides, they must be refined by treating them in a furnace, such as an electric arc discharge furnace or an induction oven, by blowing or by similar methods of refining to obtain steel which then may be discharged from the furnace, after being rid of slag, and then used for useful purposes.

It has already been proposed to melt such materials in a melting vessel in such a manner that the starting materials are accommodated in the vessel to form a column of material in the vessel, the lowermost part of the column being subjected to heat generated by burning a combustible substance in the lowermost region of the column, by creating an electric discharge arc in such region, or by similar methods. In this arrangement, the heating arrangement melts the starting material and the molten material accumulates in the lowermost portion of the vessel to be discharged therefrom through a discharge opening located in the bottom portion of the vessel. An accumulating receptacle is then located underneath the discharge opening of the vessel and the molten material accumulates therein to be subsequently transported to and introduced into a conventional refining or similar converting furnace. This method and arrangement are very uneconomical, particularly since the molten material loses a substantial part of its heat content to the environment before it can be delivered to the furnace in which it is refined.

In order to avoid the above-mentioned drawback, it has also already been proposed to replace the accumulating receptacle by an electric induction or arc discharge oven which has an upper inlet opening communicating with the discharge opening of the melting vessel. In this prior-art arrangement, the oven is constructed as a flow-through container into which the starting material in its melted form is introduced on a continuous basis through the inlet opening of the container, while slag is separated from and separately but continuously discharged from the container through a slag outlet opening, while the steel which has been previously subjected to the necessary heat-treatment and which has been possibly supplemented with additives, is also continuously discharged from the container through a steel-outlet opening which is spaced from the outlet opening for slag. It is true that this arrangement avoids the above-mentioned disadvantage by directly communicating the outlet or discharge opening of the vessel with the inlet opening of the container or oven. However, since the oven works on a continuous basis, particularly as the steel-discharging part of the operation thereof is concerned, this results in a further disadvantage that the just refined steel discharged from the oven or furnace through the steel-discharge opening thereof must be accumulated in a receptacle, which takes up a relatively long period of time, particularly if the receptacle is of such dimensions which are of interest in steel-producing installations. The particular disadvantage of this arrangement is to be seen in the fact that the slowly accumulating refined steel in the receptacle dissipates a substantial part of its heat content into the ambient atmosphere and a not insubstantial amount of the heat content is also lost by convection and conduction. Thus, when the receptacle is full, the temperature thereof is not uniform in all regions thereof so that the steel must be subsequently heat-treated in order to homogenize the temperature throughout the body of steel accommodated in the receptacle. A further disadvantage of the continuous operation of the furnace and particularly of the continuous discharge of the steel therefrom is the fact that a full receptacle has to be replaced by an empty receptacle while further amounts of steel are being continuously discharged from the outlet opening for steel, which is a rather laborious if not dangerous operation.

SUMMARY OF THE INVENTION

Accordingly, it is an object of the present invention to avoid the disadvantages of the prior art arrangements.

More particularly, it is an object of the present invention to provide a furnace for producing steel from scrap, sponge iron, pellets or similar starting materials, which is simple in construction and reliable in operation.

It is still another object of the present invention to provide a furnace of the above-mentioned type which is capable of cooperating with a continuously working premelting vessel, in which the starting materials are melted, but which can be tapped from time to time in order to remove slag and steel therefrom.

It is a further object of the present invention to provide a furnace in connection with which the safety of the environment and of the operating personnel are better assured than in similar prior art arrangements.

Finally, it is an object of the present invention to provide a furnace in which the steel refined therein may be used without further aftertreatment.

In pursuance of these objects and others which will become apparent hereafter, one feature of the present invention resides, briefly stated, in a steel-producing installation, in a combination which comprises a container having an upper region provided with an inlet opening, a lower region bounding a depression, and a middle region formed with outlet means. An arrangement is provided for continuously introducing starting materials into the container through the inlet opening to form a body in the depression. The body is treated in the depression to obtain molten steel and slag. The container is mounted on a mounting arrangement for tilting about a substantially horizontal axis to thereby tap slag and steel, respectively, through the outlet means, the axis being located at the inlet opening of the container so that starting materials can be continuously introduced into the container regardless of the extent of tilting thereof about the axis.

This container may preferably be used in connection with a pre-melting vessel in which the starting material is melted, the molten material accumulated in the bottom region of the vessel being discharged therefrom through a discharge opening at the bottom of the vessel, the discharge opening being located above the inlet opening of the container and in communication therewith.

As a result of the location of the tilting axis of the container at the inlet opening thereof, it is achieved that the molten material emerging from the pre-melting vessel can be continuously introduced into the container without having to interrupt the melting process in the pre-melting vessel. On the other hand, however, the refined steel can be discharged from the container as a result of the fact that the container is tapped, that is in relatively large amounts at any given time, so that the above-mentioned disadvantages of the prior art devices are overcome thereby. The same, of course, is also valid for the slag, even though the problem of loss of heat content may not be so important.

In a currently preferred embodiment, the inlet opening is bounded by a sleeve-shaped element forming part of, or connected to, the upper region of the container, the sleeve-shaped element being, in a particularly advantageous embodiment of the present invention, of a funnel-shaped configuration and may diverge in the downward direction, the axis of tilting of the vessel extending through the narrowest region of the funnel-shaped element. The dimensions of the sleeve-shaped element are so selected that the molten starting material does not come in touch with the sleeve-shaped element even in the event that the container is tilted out of its normal position to a large extent, and thereby it is prevented that the molten starting material may erode or otherwise damage the sleeve-shaped element. On the other hand, the inlet opening is so arranged at the upper region of the container that the stream of the molten material emerging from the premelting vessel falls directly into the body of molten material in the container, thus avoiding the danger that the material may come into contact, during its downward fall, with the walls bounding the interior of the container and thus erode or otherwise damage the walls.

When the container is heated by means of electrodes which are arranged at and centrally distributed about a vertical axis of the container, then the inlet opening can be arranged at the upper portion or region of the container and at a location which is offset from the vertical axis of the container in the direction of the horizontal tilting axis. On the other hand, the inlet opening is still spaced a substantial distance from the walls bounding the interior of the container so that the molten starting material which enters the container through the inlet opening thereof still does not have an opportunity to contact and thus damage the interior surface of the container. In this connection, it is to be understood that the fire-resistant refractory lining of the container is especially sensitive to the eroding action of such a stream of molten metal.

On the other hand, when the container is an inductively heated electric oven, then the inlet for the molten material can be arranged around the vertical axis of the container. The inlet opening can be again surrounded by a sleeve-shaped funnel, but this time the inlet opening may be elongated in the tilting direction of the container, that is, transversely of the horizontal axis of tilting of the container. In any event, the actual shape of the inlet opening and of the sleeve-shaped element surrounding the same will to a large degree depend on the exact position of the tilting axis, on the size of the discharge opening of the vessel, and on other considerations of practical nature.

One of the main advantages of the construction and mounting of the container in the above-discussed manner is that the gap which exists between the pre-melting vessel and the closest part of the sleeve-shaped element surrounding the inlet can be kept to a minimum, so that the molten starting material falls freely through only a relatively small distance after being discharged from the discharge opening and before being accepted in the inlet opening of the container, so that the temperature of even the outer surface of the stream of molten metal flowing from the vessel into the container will not be noticeably reduced. On the other hand, the gap is so small that noxious gases resulting from the treatment of the body of material in the container will be able to escape through the gap between the pre-melting vessel and the container only to a negligible extent.

In order to obtain the tilting motion of the container about the above-mentioned horizontal axis, the container is provided laterally with mounting elements which have cam surfaces each of which has a center located on the tilting axis. The mounting members are supported on rollers, and the tilting motion thereof is achieved by utilizing either a hydraulic cylinder-and-piston arrangement which has spaced end portions connected to a support and to the container or one or more of the mounting members, or by means of a toothed rack connected to at least one of the mounting members, a selectively driven pinion being in meshing engagement with the teeth of the toothed rack. The latter arrangement of the mounting members results in a further advantage that there is available underneath the furnace or container a free space through which a carriage may move on which there are supported receptacles for accommodating the steel and slag which is discharged from the container through the respective outlet opening.

The heat treatment of the body of the starting material to obtain slag and steel results in generation of substantial amounts of vapors and also of noxious gases. Therefore, the interior of the container is so constructed that the overall volume thereof is 2 to 6 times the volume of the treated body of material received in the depression of the container immediately prior to the tapping of the slag and steel, so that there is available sufficient space into which the gaseous substances can expand. Furthermore, there may be provided an exhaust conduit for discharging the noxious gases from the interior of the container, which may be connected to a scrubber or a similar particulate material removing arrangement.

A very important advantage of the arrangement of the present invention is that an only slightly modified conventional electric oven or furnace can be used as the container of the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
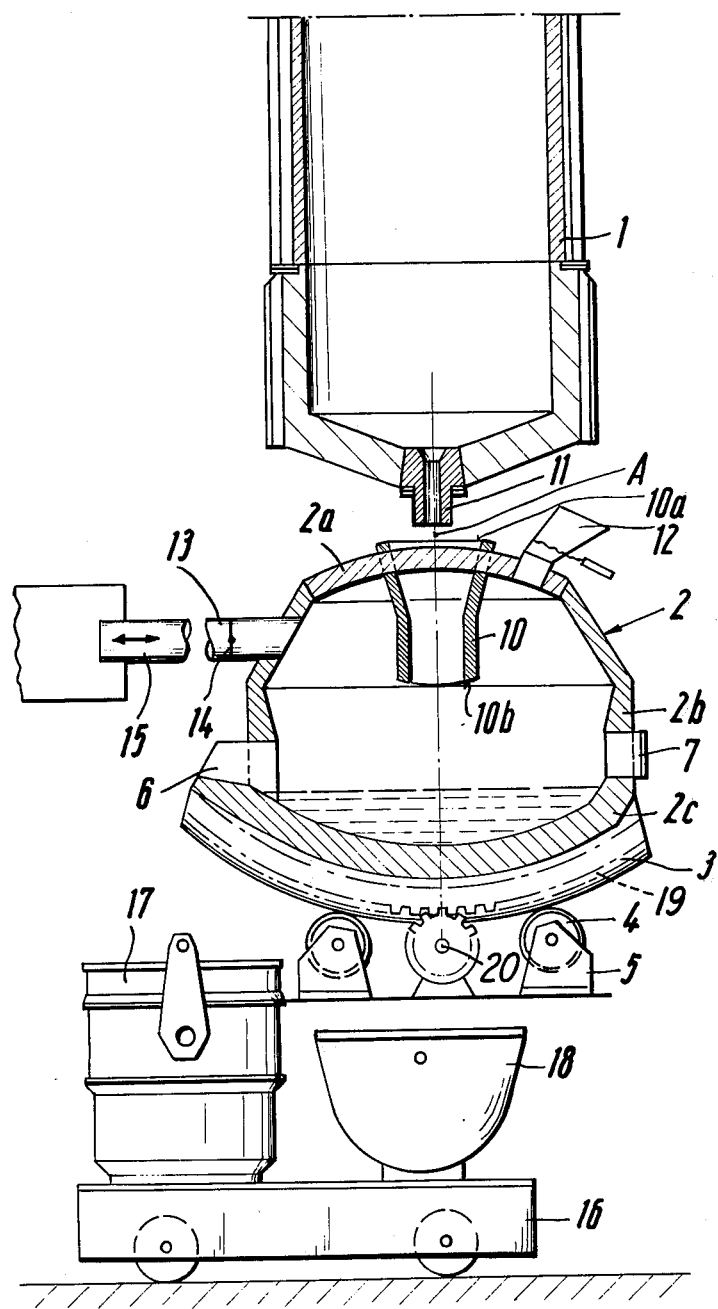
FIG. 1 is a partially sectioned side elevational view of the arrangement of the present invention.

Referring now to the drawings, it will be appreciated that the same parts have been identified with the same reference numerals in the two views of the drawing, but that some of the parts have been omitted from one or the other of the views in order to simplify the drawing. As illustrated, the arrangement of the present invention includes a pre-melting vessel 1 and a container 2 located underneath the vessel and operative for refining the starting materials to obtain steel. The vessel 1 is of completely conventional construction so that only those parts thereof which are necessary for understanding the present invention have been illustrated. However, it is to be understood that the vessel 1 is equipped with non-illustrated heating means which heats the lowermost part of a column of starting material, such as scrap, sponge iron, pellets or similar materials. The heating means may include a lance which may pass through the vessel 1 coaxially therewith from above, or from below through the bottom of the vessel 1. The heat necessary for melting the starting material in the vessel 1 can be obtained either by burning combustible substances to obtain a flame in the lowermost region of the column of starting material in the vessel 1, or by utilizing electric arc discharge. The flame or the electric arc discharge preferably act on the greater part of the cross-sectional area of the column of starting material in the lowermost region thereof, but is spaced from the bottom of the pre-melting vessel 1 so that the molten starting material constitutes a heat-protecting layer at the inner surface of the vessel 1 to protect the refractory material from being subjected to too high temperatures. Instead of or in addition to the central heating of the column of starting material in the vessel 1, the starting material may also be melted by using an annular flame or an annular arc discharge. All of the above-discussed heating means are well known and thus need no further detailed discussion or illustration.

Figure 2:
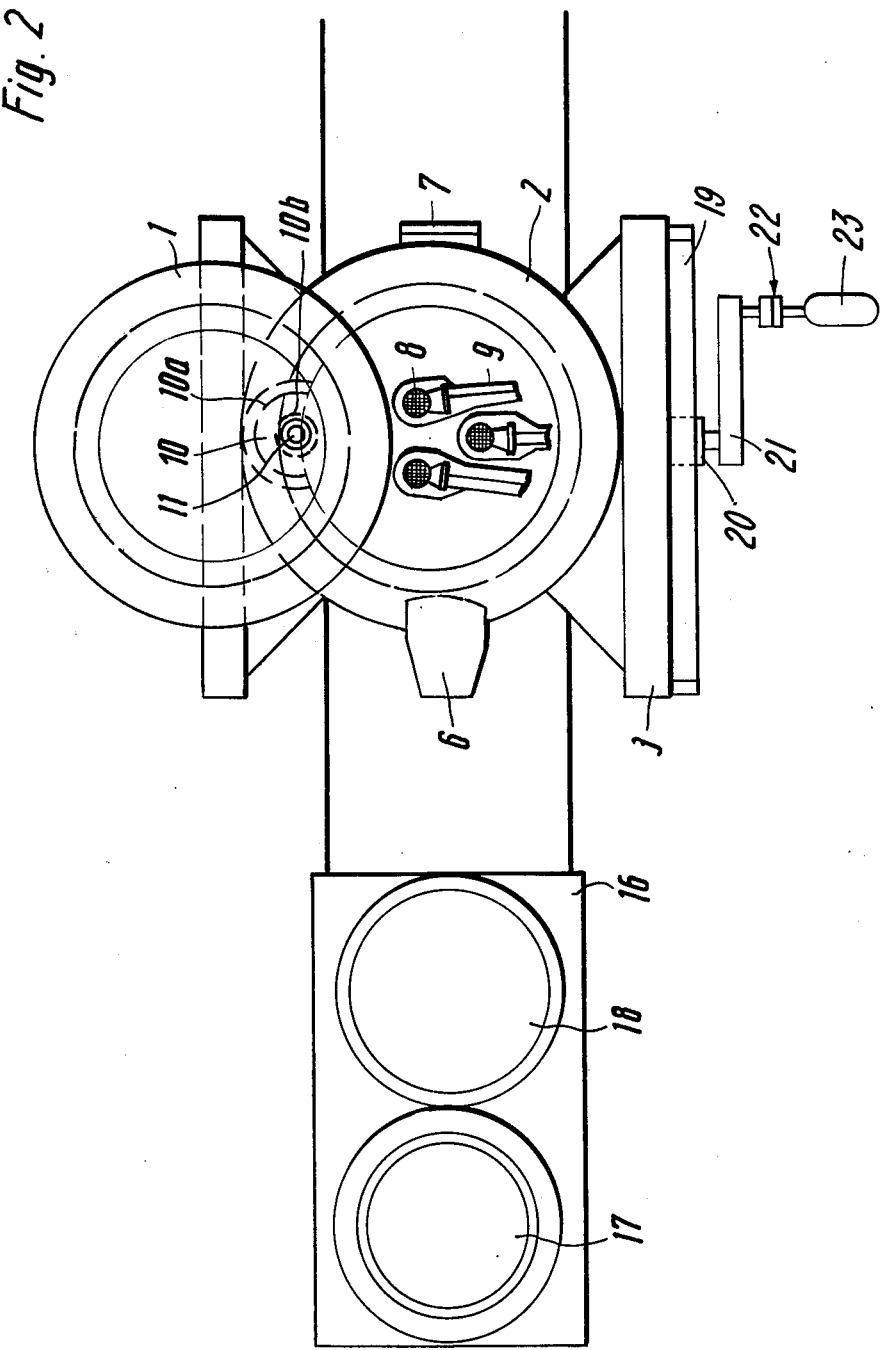
FIG. 2 is a top plan view of the arrangement illustrated in FIG. 1 with some elements omitted.

Either the vessel 1 or the container 2 or both of them may be mounted on a support structure so as to be replaceable by a different vessel or container of the same type. The arrangement for mounting the vessel 1 has not been illustrated because it is entirely conventional, while the mounting arrangement of the container 2 will now be discussed. Such a mounting arrangement includes mounting members 3 connected to the container 2 laterally thereof, the mounting members 3 having part-circular cam surfaces which are supported on a plurality of rollers 4 which, in turn, are mounted on supports 4 or rotation about their axes. The centers of the part-circular cam surfaces of the mounting members 3 are located at a substantially horizontal axis A which is located at the upper region of the container 2. The tilting of the container 2 about the axis A may be achieved, for instance, by mounting non-illustrated conventional toothed racks on the members 3, and by so mounting a pinion that it meshes with its associated toothed rack, the pinion being driven into rotation about its axis by non-illustrated driving means. Alternatively, the container 2 may be tilted by means of conventional non-illustrated cylinder-and-piston units which may be, for instance, hydraulically operated. The hydraulic units may be provided at either or at both sides of one or both of the members 3. The container 2 is provided in its tilting direction with tap holes 6 and 7 for steel or slag, either one of which may be constructed either as a tapping door or a tapping spout. The container 2 includes an upper region constructed as a lid 2a dismountably mounted on the remainder of the container 2 for repair purposes, a middle region 2b and a lower region 2c. As illustrated in FIG. 2, electrodes 8 may extend through the lid 2a centrally thereof into the interior of the container 2, electric current being supplied to the electrodes by appropriate conductors 9.

An inlet opening is provided in the upper region of the container 2, being bounded by a sleeve-shaped element 10. The inlet opening has a central axis which is located in a plane defined by the horizontal axis A and by a substantially vertical axis of the container 2. The element 10 may be funnel-shaped and may have an inlet portion 10a having such dimensions that it is always located underneath an outlet opening 11 of the pre-melting vessel 1, the passage in the portion 10a being always in communication with the passage in the discharge opening 11, regardless of the extent of tilting of the container 2 about its axis. In this manner, the melted starting materials which flow out of the outlet opening 11 of the vessel 1 will always pass through the inlet opening of the container 2 which is bounded by the sleeve-shaped element 10. The portion 10a of the inlet 10 of the container 2 is so configurated in the tilting direction of the container 2 that the walls of the element 10 which limit the inlet opening in the tilting direction of the container 2 will be always located outside the stream of molten material emerging from the discharge opening 11 of the pre-melting vessel 1 regardless of the instantaneous position of the container 2.

The element 10 is so arranged on the portion of the middle region 2b of the container which conically converges toward the lid 2a and offset from the central axis of the container 2 that an outlet portion 10b of the funnel-shaped element 10 is arranged at a distance from the vertical walls of the container 2, thereby permitting filling of the molten material into the container 2 from the vessel 1 without the refractory lining of the container 2 being contacted by the molten material being introduced into the container 2, whereby the lining is protected from being eroded or otherwise damaged by the molten starting material.

The element 10 is also larger in the tilting direction of the container 2 than the discharge opening 11 of the pre-melting vessel 1 so that the molten starting material which is discharged from the vessel 1 through the discharge opening 11 does not, for all intents and purposes, come into contact with the material of the sleeve-shaped element 10 so that the latter is not subjected to wear to any considerable extent. In a particularly advantageous embodiment of the present invention, the sleeve-shaped element 10 is connected to the conical region of the middle region of the container 2 by means of a flange in order to insure that the sleeve-shaped element can be easily replaced. A gas-tight charging opening 12 is provided in the upper portion or lid 2a of the container 2, serving the purpose of continuously introducing additives such as lime, alloying metals or similar additives. Furthermore, the conical portion of the middle region 2b of the container 2 is provided with a conduit 13 for removing noxious gases therefrom the interior of the container 2, a valve 14 being provided in the interior of the conduit and being operative for closing the same, the conduit 13 being connected with a displaceable pipe 15 and communicating therewith when the container 2 is in its central position and when the valve 14 is opened. On the other hand the valve 14 closes the conduit 13 when the container 2 is tilted in one or other direction about the axis A. Both the charging inlet 12 and the conduits 13 and 15 have been omitted in FIG. 2.

A carriage 16 may be mounted underneath the container 2 and between the mounting members 3 and the rollers 4 with their supports 5, two receptacles 17 and 18 are being supported on the carriage 16, one for slag and the other for steel discharged from the respective outlet openings 6 and 7 of the container 2. Because of the arrangement of the carriage 16 between the mounting arrangements 3, 4 and 5, the former can move along a straight track underneath the container 2 so as to advantageously position the receptacles 17 and 18 relative to the outlet openings 6 and 7.

While the present invention has been discussed as used in connection with an arc discharge electric oven, the container 2 can also be constructed in a conventional manner as an inductive electric oven. In that event, because of the absence of the electrodes 8 from the central region of the container 2, the inlet opening and the sleeve-shaped element 10 surrounding the same can also be advantageously located in the center of the lid 2a.

The inlet opening bounded by the portion 10a of the element 10 may have an elongated configuration in the direction of tilting of the container 2.

A portion 10b of the sleeve-shaped element 10 may diverge in a downward direction, and the axis A may be located at the narrowest region of the inlet opening bounded by the sleeve-shaped element 10.

When the body of the material in the depression of the container 2 is to be blown, conventional blowing arrangements, such as an oxygen lance or bottom blowing nozzles may be provided in the container 2, such arrangements being conventional and thus they have not been illustrated. The discharge nozzle 11 of the pre-melting vessel 1 is advantageously offset from the central axis of the vessel 1 as illustrated in FIG. 2, whereby it is assured that the upper region of the container 2 is easily accessible.

The present invention has been described therein connection with introducing molten material into the container 2, however, it is also possible to introduce solid material into the container 2 through the inlet opening thereof, the solid material being introduced into the container 2 in substantially continuous manner.

The starting materials which may be introduced into the container 2 in their solid state are, for instance, pre-heated scrap or cold or warm pellets. Preferably, the solid materials are pre-heated in order to introduce them into the refining container 2 at a temperature compatible with the continuance of the refining process conducted therein, and the pre-heating may take place in, for instance, a tubular rotating oven which can thus operate on a continuous basis particularly since it is no longer necessary to interrupt the operation of the pre-heating oven during the tapping of the slag and of the steel from the container 2.

It will be understood that each of the elements described above, or two or more together, may also find a useful application in other types of constructions differing from the types described above.

While the invention has been illustrated and described as embodied in an electric arc discharge oven, it is not intended to be limited to the details shown, since various modifications and structural changes changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a steel-producing installation, a combination comprising a support element; a container element including an upper region having an inlet opening, a middle region having outlet means, and a lower region bounding a depression for a body of materials to be treated; means for treating the body in said depression to obtain molten steel and slag; means for mounting said container element on said support element for tilting relative thereto about a horizontal axis located at said inlet opening, between a normal operating position and at least one tilted position in which slag and steel are respectively tapped through said outlet means, including at least one mounting member rigid with one of said elements and having a cam surface which has centers of curvature defining said axis, and cam follower means mounted on the other of said elements and operative for contacting and following said cam surface of said mounting member during the tilting of said container element between said positions thereof; and means for continuously introducing starting materials into said container element in a path which leads toward said body through said inlet opening in and inbetween said positions of said container element as a result of the location of said axis at said inlet opening, whereby the latter substantially retains its spatial position relative to said path during tilting of said container element.

2. A combination as defined in claim 1, wherein said introducing means includes a pre-melting vessel for melting starting materials therein and having a stationary discharge opening above and in communication with said inlet opening of said container element.

3. A combination as defined in claim 1, wherein said starting materials are selected from the group consisting of scrap, sponge iron and pellets.

4. A combination as defined in claim 1, wherein said treating means includes a charging opening in said container element for introducing additives into said body.

5. A combination as defined in claim 1, wherein said upper region includes a sleeve bounding said inlet opening.

6. A combination as defined in claim 5, wherein said sleeve has an inlet region and an outlet region downstream of said inlet region; and wherein said outlet region has such dimensions as not to interfere with the passage of the starting materials through said sleeve regardless of the extent of tilting of said container about said axis.

7. A combination as defined in claim 5, wherein said sleeve is funnel-shaped.

8. A combination as defined in claim 5, wherein said sleeve diverges in the downward direction; and wherein said axis is located at the narrowest region of said sleeve.

9. A combination as defined in claim 25, wherein said treating means further includes means for heating said body in said depression.

10. A combination as defined in claim 9, wherein said heating means includes electrodes in the interior of said container element and operative for heating said body by arc discharge.

11. A combination as defined in claim 9, wherein said heating means includes at least one induction heating element at said container element and operative for inductively heating said body.

12. A combination as defined in claim 1, wherein said container element has a vertical axis; and wherein said inlet opening is offset from said vertical axis in direction of said horizontal axis.

13. A combination as defined in claim 1, wherein said container element has a vertical axis; and wherein said inlet opening surrounds said vertical axis.

14. A combination as defined in claim 1, wherein said inlet opening is an elongated slot extending transversely of said horizontal axis in direction of tilting of said container element.

15. A combination as defined in claim 1, wherein said regions of said container element have internal surfaces bounding the interior of said container element; and wherein said inlet opening is remote from said internal surface of at least said middle region in any position of said container element.

16. A combination as defined in claim 15, wherein the volume of said interior amounts to two to six times the volume taken up by said body in said depression immediately prior to said tapping.

17. A combination as defined in claim 1, wherein said outlet means includes two opposite outlet openings, one for slag and the other for steel, provided in said middle region of said container above said depression whereby tilting of said container element in one direction results in tapping of slag through said one outlet opening, and tilting in the opposite direction results in tapping of steel through said other outlet opening.

18. A combination as defined in claim 1, wherein said cam follower means includes at least two rollers mounted on said other element for rotation about spaced axes and in rolling contact with said cam surface.

19. A combination as defined in claim 18, wherein said mounting member and said rollers are arranged at one side of said container element; and further including a similar additional mounting member and simular additional rollers arranged at the other side of said container element and with spacing from said mounting member and said rollers, respectively.

20. A combination as defined in claim 18; and further comprising means for tilting and container between said positions.

21. A combination as defined in claim 20 wherein said tilting means includes a toothed rack on said container element, and a pinion mounted on said support element for rotation about its axis and in mesh with said toothed rack.

22. A combination as defined in claim 20 wherein said tilting means includes a hydraulic cylinder-and-piston unit having spaced end portions connected to said container element and said support, element respectively.

23. A combination as defined in claim 1, and further including means for withdrawing gaseous by-product of said treating from the interior of said element container.

* * * * *